Jan. 25, 1955     H. ST. PIERRE     2,700,405

TIRE CHAIN AND TIGHTENING MEANS THEREFOR

Filed June 22, 1950

INVENTOR.
HENRY ST. PIERRE
BY
Charles R. Fay,
ATTORNEY

United States Patent Office 2,700,405
Patented Jan. 25, 1955

2,700,405

TIRE CHAIN AND TIGHTENING MEANS THEREFOR

Henry St. Pierre, Worcester, Mass.

Application June 22, 1950, Serial No. 169,552

2 Claims. (Cl. 152—242)

This invention relates to tire chain and tightening means therefor, and is particularly adapted to the tightening or adjustment of the side chains after the chain has been applied to the wheel of the vehicle, and it is found desirable to tighten up the side chains, i. e., to reduce the effective length thereof because of the fact that for one reason or another the chains have become too loose.

Particularly with truck and tractor tires the extremely deep treads thereof upon being worn, greatly reduce the circumference of the tire, so that the chains put on when the tires were new, become very loose and must be shortened as for instance by removing links of the side chains. This invention provides means for effectively reducing the lengths of the side chains and tightening the same without the necessity of the relatively time-consuming and difficult way of tightening the chains by removing links.

Another object of the invention resides in the provision of a tire chain having the usual chain tighteners at corresponding ends of the side chains, a series of cross chains, and a relatively wide gap between the cross chains at the central portion of the entire chain, i. e., midway of the length of the side chains, this relatively wide gap being provided with special hook type fasteners which may be used to adjustably tighten the chain by being hooked into various selected links so as to effectively reduce the overall length of the chain.

Other objects and advantages of the invention will appear hereinafter.

Reference is to be had to the accompanying drawings in which

When chains are first applied to new or highly treaded vehicle tires such as tractor tires, they may be made to fit by a well known and relatively simple adjustment by reason of the conventional chain tighteners at the ends of the chains. When, however, the treads wear down to a marked degree, the chains become loose and must be tightened up. This may be done to some extent by manipulating the chain tighteners in the usual way but this action brings the two end cross chains close together and it often becomes necessary to actually remove one of the cross chains as well as several links of the side chains.

Obviously in cases where the chain is still useful but the tire is worn out, the chain is now too small to be used on a new tire and links must be added and any cross chain previously removed must be replaced. This is a difficult and time-consuming task, the need for which is completely done away with with the present invention.

Figure 1:
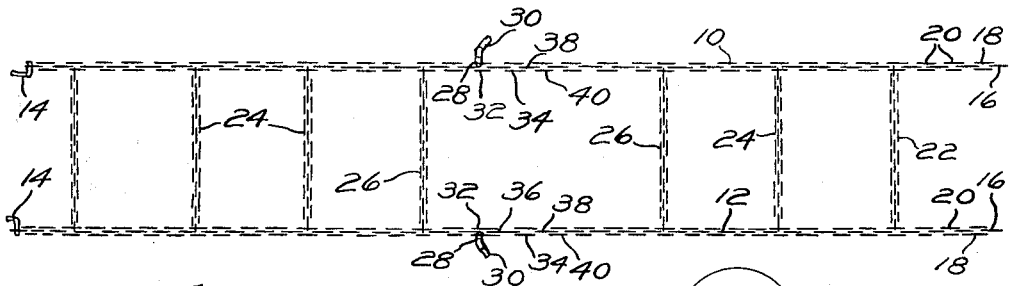
Fig. 1 is a plan view of the novel chain spread out.

As shown in Fig. 1, there is illustrated side chains 10 and 12 each of which has a conventional tightener 14 at one end and plain links 16 at the opposite end, the tighteners taking into the links 16 when the chain is placed upon the tire, in the usual manner. It is obvious that if the chain is too loose, the tighteners 14 may be placed in the next adjacent links 18, etc., in order to more properly secure the chain to the tire.

When the tire wears down, the tighteners 14 may be continuously changed to be inserted into succeeding links 20. Of course, this leaves the end links 16 dangling and for this reason these links are often cut off. Eventually the cross chain indicated at 22 is reached and this must be removed in order to properly secure the tighteners 14 in adjusted relation as described.

However, the present invention contemplates the provision of for instance the usual number of cross chains 24 including that at 22, but with a relatively enlarged gap between the central cross chains 26, and the provision of chain tightening means at this location so as to take up the side chains 10 and 12 at a point diametrically opposite from the tighteners 14 as regards the wheel on which the chain is disposed.

Figure 2:
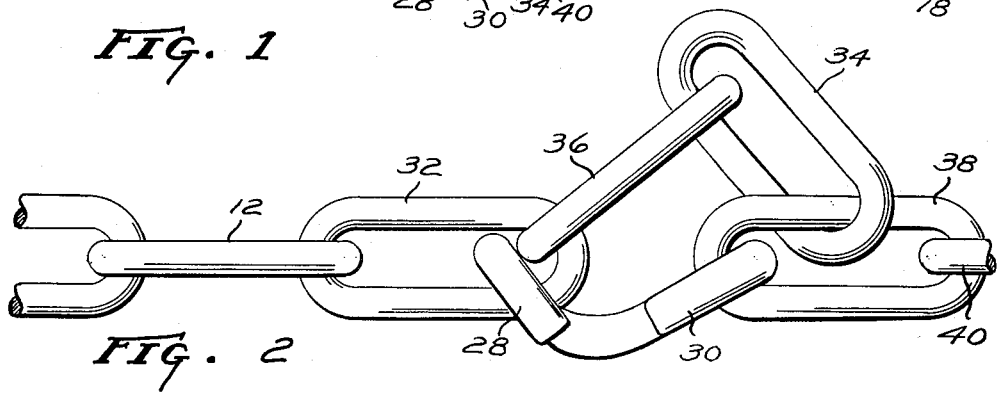
Fig. 2 is an enlarged view showing a side chain tightened.
Figure 3:
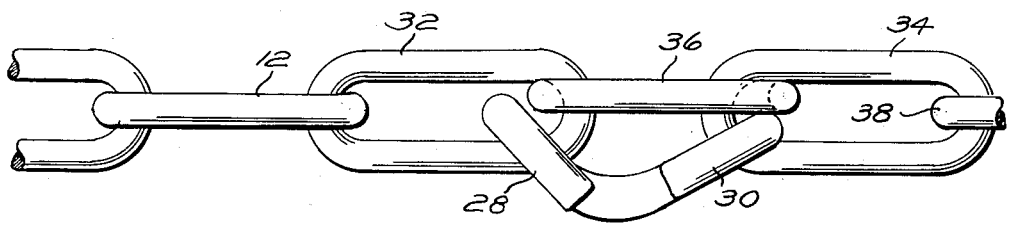
Fig. 3 is a view similar to Fig. 2, but showing the side chain tightened to a lesser degree.
Figure 4:
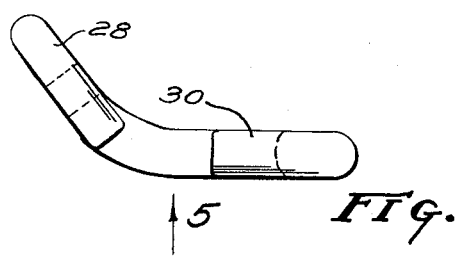
Fig. 4 is an edge view of the hook tightener.
Figure 5:
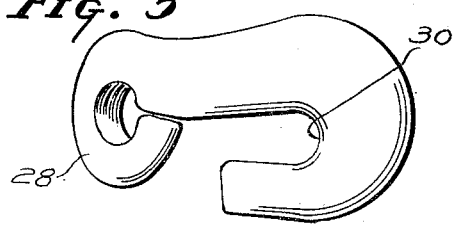
Fig. 5 is a view in front elevation thereof looking along the arrow 5 in Fig. 4.

The novel chain tightener assumes the form of a hook best shown in Figs. 4 and 5, this hook comprising an eye 28 which is closed upon a selected link of the side chain and having a bent bight portion generally indicated at 30 which is elongated relative to the eye and which is bent approximately to the degree shown in Figs. 2 and 3.

Referring now to Figs. 2 and 3, the eye 28 of the hook is shown as permanently closed on or otherwise secured to a link 32 of side chain 12; but the bight 30 not being secured or hooked into any link, as is the condition shown in Fig. 1, the chain then assumes its greatest length. However, if the bight 30 be hooked into link 34 spaced one link 36 from link 32, the chain is tightened to a small degree, see Fig. 3, since the effective length of the hook is less than that of the link.

A greater adjustment is achieved by hooking the bight 30 of the hook into link 38, see Fig. 2, whereupon the links 34 and 36 are essentially immobilized, but they do not dangle and they do not have to be removed. Under these conditions the hook becomes a part of the side chain and takes the stress thereon as well as any of the links 32 or 38. Of course, it is understood that the hook may be placed into links 40, etc., in order to further tighten the chain.

It will be seen that this invention provides a chain tightening means which will conform to all conditions of wear of any tire without removing links or cross chains so that the chain is still capable of use when the old worn tire is discarded and the new tire applied. It is well understood that the side chains 10 and 12 take little or no wear, and the cross chains are easily replaceable. Also, the chain take-up comes evenly at two diametrically opposite sides of the wheel for better balance and to avoid the necessity of making the end cross chains come too close together or to be removed. Furthermore, the immobilized links do not dangle and bang around as would otherwise be the case; and the hook type chain tightener herein disclosed is extremely easy to manipulate both in application and removal. The gradually shortening gap at the center of the chain is designed to approximate the conventional spacing of the cross chains after one or two adjustments.

Having thus described my invention and the advantages thereof, I do not wish to be limited to the details herein disclosed otherwise than as set forth in the claims, but what I claim is:

1. Tire chain comprising a plurality of uninterrupted side chains and interconnecting cross chains, tighteners at the ends of the side chains, said cross chains being relatively widely spaced at an intermediate point along the length of the side chains, and chain tighteners at said intermediate point selectively effective to adjust the length of the spacing between the cross chains at that point, said second mentioned chain tighteners comprising hooks each secured to a side chain link and having a bight engageable in selected links to effectively cut out intermediate links without removing the same.

2. Tire chain comprising a plurality of side chains each continuous from end to end thereof and interconnecting cross chains, tighteners at the ends of the side chains, said cross chains being relatively widely spaced at an intermediate point along the length of the side chains, and chain tighteners at said intermediate point selectively effective to adjust the length of the spacing between the cross chains at that point, said second mentioned chain tighteners comprising hooks each secured to a link, said hooks being laterally bent so that the bight portion thereof is at an angle to the remainder of the hook, each said bight portion being engageable in a selected link of its side chain to cause intermediate links to be inoperative without being removed.

References Cited in the file of this patent

UNITED STATES PATENTS

| | | |
|---|---|---|
| Re. 15,387 | Ratzburg | June 13, 1922 |
| 320,047 | Chambard | June 16, 1885 |
| 703,843 | Smith | July 1, 1902 |
| 1,263,926 | Reyburn | Apr. 23, 1918 |
| 1,519,688 | McCollum, Jr. | Dec. 16, 1924 |
| 1,761,647 | Thomas | June 3, 1930 |
| 1,777,773 | Sjodin | Oct. 7, 1930 |

FOREIGN PATENTS

| | | |
|---|---|---|
| 373,623 | Germany | April 14, 1923 |